No. 740,252. PATENTED SEPT. 29, 1903.
F. C. DAVIS.
DUMPING CART.
APPLICATION FILED FEB. 25, 1903.
NO MODEL.

Witnesses:
C. D. Kesler
James L. Norris, Jr.

Inventor
Frank C. Davis
By James L. Norris
Atty.

No. 740,252. Patented September 29, 1903.

UNITED STATES PATENT OFFICE.

FRANK C. DAVIS, OF SAN ANTONIO, TEXAS.

DUMPING-CART.

SPECIFICATION forming part of Letters Patent No. 740,252, dated September 29, 1903.

Application filed February 25, 1903. Serial No. 145,034. (No model.)

*To all whom it may concern:*

Be it known that I, FRANK C. DAVIS, a citizen of the United States, residing at San Antonio, in the county of Bexar and State of Texas, have invented new and useful Improvements in Dumping-Carts, of which the following is a specification.

This invention relates to dumping-carts, and more especially to that class of such carts employed for the collection of garbage, ashes, and the like; and it has for its object to provide in a cart of the type referred to improved means for locking the cart-body to the frame to hold it in its normal position and which may be released quickly and with the exertion of but little power to cause the cart to dump its contents.

To this end my invention consists in the features and in the construction, combination, and arrangement of parts hereinafter described, and particularly pointed out in the claims following the description, reference being had to the accompanying drawings, forming a part of this specification, wherein—

Figure 1:
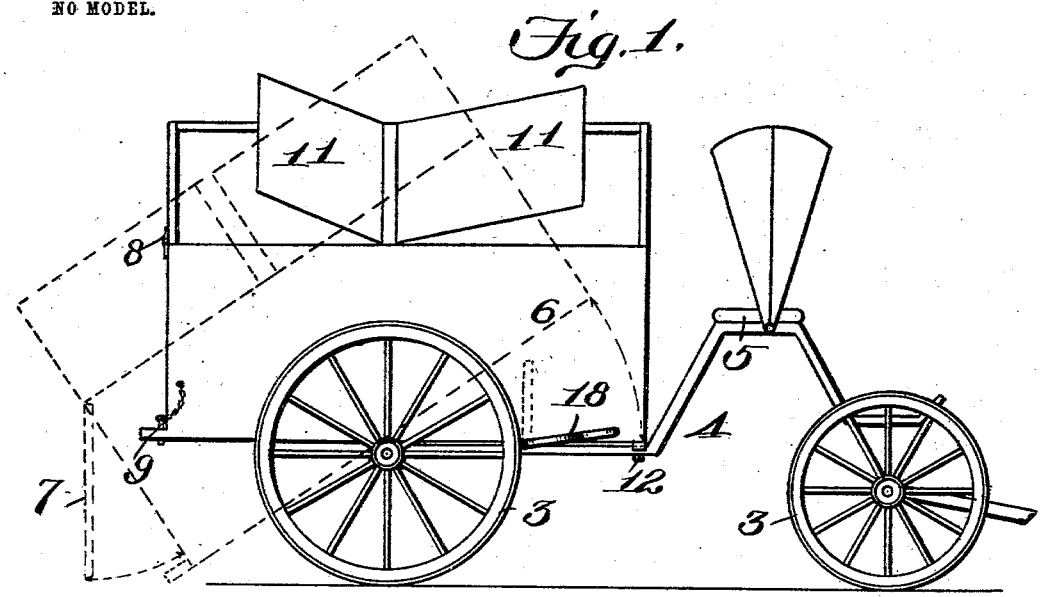
Figure 3:
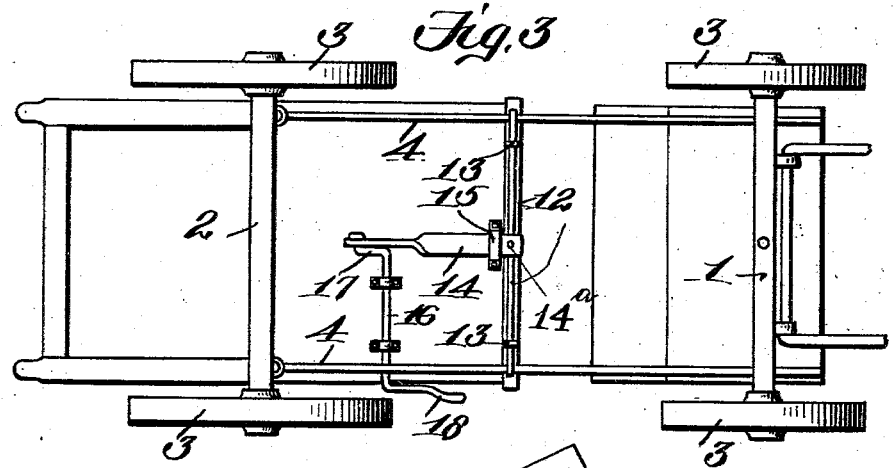
Figure 2:
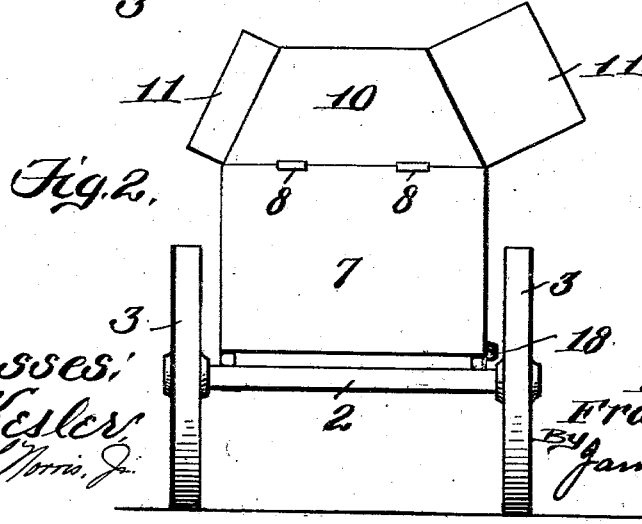

Figure 1 is a view in side elevation of my improved dumping-cart, the body of the cart being shown in its dumping position in dotted lines. Fig. 2 is a rear end view thereof, the side doors or covers being shown partially open; and Fig. 3 is a bottom plan view.

Referring to the drawings, the numerals 1 and 2, respectively, indicate the front and rear axles, and 3 the ground-wheels journaled thereon. The frame of the cart consists of two parallel metallic side bars 4, each connected, respectively, at its front and rear ends to the fifth-wheel or bolster on the front axle and to the rear axle, said bars being arched in rear of the front axle to form a support for the driver's seat 5 and also to permit of the front wheels being swung under the frame in turning.

The numeral 6 indicates the body of the cart, consisting of a rectangular vessel or box-like structure permanently closed on its sides, front, and bottom and provided at its rear end with a gate or door 7, hinged at its upper end, as at 8, and at its lower end provided with a suitable fastening 9 of any ordinary or preferred construction for locking the gate or door in its closed position. The body 6 is provided with a peaked top 10—that is to say, said top is of the shape of a truncated triangle in vertical cross-section, and its opposite inclined sides are closed by hinged doors or covers 11.

The bottom of the body 6 of the cart is pivotally supported at a point slightly in rear of its center to the rear axle 2 and rests at its front end on the bars 4, forming the frame, the arrangement being such that the front end of the cart normally rests by gravity on the frame, but will require but little power to swing it rearwardly about the axle to dump the cart.

The cart-body is detachably locked to the frame by the following mechanism: Arranged beneath the front edge of the bottom of the cart are two toggle-arms 12, that loosely pass through guides, eyes, or staples 13, attached to the bottom of the cart near its sides. The inner ends of said arms are pivoted to the forward end of a sliding bar 14 by a single bolt or pivot-pin 14$^a$, and said sliding bar is arranged centrally and longitudinally beneath the forward portion of the bottom of the cart and passes loosely through a guide, eye, or staple 15, attached to the bottom of the cart, at or near the forward end of the latter. Journaled in suitable bearings on the bottom of the cart and extending from the center to one side of the latter is a rock-shaft 16, which is provided at its inner end with a crank 17, that is loosely connected to the rear end of the slide-bar or connecting-rod 14, and said rock-shaft 16 is provided at its outer end with a crank-handle 18 by means of which it may be turned in its bearings. The toggle-arms are of such length that when they are in alinement with each other their outer ends will project beneath the side bars 4 of the frame and hold the forward end of the cart-body to its seat on the frame and prevent the cart from dumping. When it is desired to dump the cart, the body is released by raising the crank-handle 18 to a vertical position, thereby giving the rock-shaft a one-quarter turn. This movement of the rock-shaft projects the connecting-rod 14 forward and retracts the toggle-arms from beneath the side bars 4, whereupon the cart-body can be oscillated rearwardly upon the axle to dump its contents. When the cart-body is returned to its normal position—that is to say, when its forward end is again brought to rest upon the frame—it is merely necessary to turn the crank-handle to a horizontal position, thereby retracting the connecting-rod and forcing the outer ends of the toggle-arms underneath the side bars 4 of the frame, and thus locking the cart-body to the frame.

Having described my invention, what I claim is—

1. In a dumping-cart, the combination with a wheel-frame and a tilting cart-body pivotally mounted on the rear axle thereof, of two arms arranged transversely of the bottom of the body, said arms loosely passing through guides fixed to said bottom and adapted to project at their ends beyond the sides of the body and beneath the frame to hold the body of the cart locked to the frame, a reciprocatory rod loosely fitted in a guide on the bottom of the cart-body and movable longitudinally relatively to the latter, one end of said rod being pivotally connected to the inner adjacent ends of the said arms, and means for reciprocating the rod to turn said arms into and out of alinement, and thereby project the ends of the arms beneath the frame and retract them from thereunder, substantially as and for the purpose specified.

2. In a dumping-cart, the combination with a wheel-frame and a tilting cart-body pivotally mounted on the rear axle thereof, of two arms arranged transversely of the bottom of the body, said arms loosely passing through guides fixed to said bottom and adapted to project at their ends beyond the sides of the body and beneath the frame to hold the body of the cart locked to the frame, a reciprocatory rod loosely fitted in a guide on the bottom of the cart-body and movable longitudinally relatively to the latter, one end of said rod being pivotally connected to the inner adjacent ends of the said arms, and a transverse rocking shaft rotatably secured to the bottom of the cart-body and provided at its outer end with a crank loosely connected with the rear end of the connecting-rod, substantially as described.

In testimony whereof I have hereunto set my hand in presence of two subscribing witnesses.

FRANK C. DAVIS.

Witnesses:
   GEO. W. POED,
   V. V. GEBT.